Patented Mar. 20, 1923.

1,449,102

UNITED STATES PATENT OFFICE.

FRIEDRICH HAYDUCK, OF WILMERSDORF, GERMANY, ASSIGNOR TO THE FLEISCHMANN COMPANY, OF NEW YORK, N. Y., A CORPORATION OF OHIO.

PROCESS FOR THE MANUFACTURE OF COMPRESSED YEAST AND THE PRODUCT.

No Drawing.   Application filed October 30, 1920.   Serial No. 420,829.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Processes for the Manufacture of Compressed Yeast and the Product (for which application for patent was filed in Germany February 24, 1915, German Patent No. 300,663), of which the following is a specification.

This invention relates to the product resulting and to a process for the manufacture of yeast by propagation in a solution containing sugar material and yeast nourishing inorganic salts.

An object of this invention is to provide a commercial procedure for yeast manufacture, and a nutrient solution adapted therefor which contains sugar material together with yeast nourishing inorganic salts added in quantities considerably greater than heretofore used; the solution employed is maintained very dilute and adapted for propagation with aeration, the degree of dilution being such as to render the salts innocuous to the yeast.

Another object is the production of a compressed bakers' yeast, which has good baking strength and keeping qualities, in a convenient and economical manner.

It is a known fact that there may be added to the usual cereal worts and mashes, which serve for the manufacture of yeast or alcohol, inorganic salts (in particular, ammonium salts, potassium salts, phosphoric acid salts, etc.) for the better nourishment of the yeast, and that the yeast will take from these salts some ingredients which are of value to it.

It is further known, that yeast also may numerically increase as to a count of the total yeast cells present in solutions which contain, besides sugar, only inorganic salts as nutrients. Such solutions are used in the laboratory for the propagation of yeast. Nutrient salts have also been proposed for use in the industrial manufacture of yeast, as is shown in United States Letters Patent to Wilcox No. 1,044,615, proposing the growth of yeast in waste sulphite liquor obtained in the manufacture of cellulose, which received a complementary addition of inorganic nutrient salts.

In all these cases, however, the yield of yeast, so far as the weight of same could be obtained at all, was very small. Furthermore, it could not be determined hitherto whether a yeast nourished solely by sugars and inorganic salts would satisfy the requirements of a compressed yeast.

For these reasons, no progress at all was made with regard to the industrial manufacture of yeast from sugar solutions by means of the addition of organic salts.

My researches have shown, however, that it is possible to obtain yeast in such large yields without any difficulty from refined beet sugar, or raw beet sugar, first or second product, all other nourishment being of a purely inorganic nature, that the manufacture of the same on an industrial scale would be profitable. The yeast produced is absolutely normal in quality and color.

In carrying out the process of this invention it is desirable that the nourishing mixture should be selected of the proper constituents, in regard to its chemical composition and the amount of water used.

In my practice the following solutions have proven successful.

To 100 parts sugar there are dissolved in tap water 6 parts ammonium sulphate, 2 parts ammonium diphosphate ($NH_4H_2PO_4$), 4 parts potassium sulphate, 2½ parts gypsum and 2½ parts magnesium sulphate. The entire mixture is made up to 6500 to 7000 parts with water. In the above example all parts are taken by weight. The resultant solution therefore has a concentration of not over 2° on the saccharometer as compared with the usual wort used in the manufacture of aerated yeast which has heretofore been of a concentration of not less than 3°.

In using refined sugar there were obtained: 32 parts compressed yeast. When using raw sugar, first product, 37.3 parts compressed yeast. When using raw sugar, second product, 41.3 parts compressed yeast.

In two batches otherwise identical but made with raw sugar, second product, there was obtained 66.6 parts of compressed yeast and 73.1 parts of compressed yeast, respectively.

The dough raising force of all yeast obtained was normal.

Having described my invention, what I claim as new and desire to secure by Letters Patent is:—

1. The process of manufacturing yeast which comprises preparing a yeast nutrient solution and propagating yeast therein with aeration, said yeast nutrient solution consisting of essentially sugar material and yeast nourishing inorganic salts, in amounts sufficient to supply all essential yeast foods for the yeast during the period of propagation, and being of such initial dilution that the said salts are innocuous to the yeast.

2. The process of manufacturing yeast which comprises preparing a yeast nutrient solution and propagating yeast therein with aeration, said yeast nutrient solution containing essentially sugar material and yeast nourishing inorganic salts, in amounts sufficient to supply all essential yeast foods for the yeast during the period of propagation, and being of an initial dilution corresponding to not more than 2° on the saccharometer whereby the said salts are rendered innocuous to the yeast.

3. The process of manufacturing yeast which comprises preparing a yeast nutrient solution, exclusive of cereal material and propagating yeast therein with aeration, said yeast nutrient solution containing essentially sugar material and yeast nourishing inorganic salts, in amounts sufficient to supply all essential yeast foods for the yeast during the period of propagation, said salts being present in a relatively high ratio to the amount of sugar material, and the yeast nutrient solution being of an initial dilution corresponding to not more than 2° on the saccharometer, whereby the said salts are rendered innocuous to the yeast.

4. The process of manufacturing yeast which comprises preparing a yeast nutrient solution and propagating yeast therein with aeration, said yeast solution containing essentially sugar material and yeast nourishing inorganic salts, in amounts sufficient to supply all essential yeast foods for the yeast during the period of propagation, said salts being present in a substantially large amount relative to the amount of sugar material, and the yeast nutrient solution being of such initial dilution that the said salts are innocuous to the yeast.

5. The process of manufacturing yeast which comprises preparing a yeast nutrient solution and propagating yeast therein with aeration, said yeast nutrient solution containing essentially sugar material and yeast nourishing inorganic salts, in amounts sufficient to supply all essential yeast foods for the yeast during the period of propagation, said salts being present in a substantial amount relative to the amount of sugar material, and the yeast nutrient solution being of an initial dilution corresponding to not more than 2° on the saccharometer, whereby the said salts are rendered innocuous to the yeast.

6. The process of manufacturing yeast which comprises preparing a yeast nutrient solution and propagating yeast therein with aeration, said yeast nutrient solution containing essentially sugar material and yeast nourishing inorganic salts, in amounts sufficient to supply all essential yeast foods for the yeast during the period of propagation, said salts being present to the amount of at least $\frac{15}{100}$ of the amount of sugar material, and the yeast nutrient solution being of such initial dilution that the said salts are innocuous to the yeast.

7. The process of manufacturing yeast which comprises preparing a yeast nutrient solution and propagating yeast therein with aeration, said yeast nutrient solution containing essentially sugar material and yeast nourishing inorganic salts, in amounts sufficient to supply all essential yeast foods for the yeast during the period of propagation, said salts being present to the amount of at least $\frac{15}{100}$ of the amount of sugar material, and the yeast nutrient solution being of an initial dilution corresponding to not more than 2° on the saccharometer, whereby the said salts are rendered innocuous to the yeast.

8. The process of manufacturing yeast which comprises preparing a yeast nutrient solution and propagating yeast therein with aeration, said yeast nutrient solution consisting of essentially sugar material and yeast nourishing inorganic salts in amounts sufficient to supply all essential yeast foods for the yeast during the period of propagation, such yeast nourishing inorganic salts including yeast assimilable nitrogen in the form of ammonium salts, said yeast nutrient solution being of such initial dilution that said salts are innocuous to the yeast.

9. The process of manufacturing yeast which comprises preparing a yeast nutrient solution and propagating yeast therein with aeration, said yeast nutrient solution containing essentially sugar material and yeast nourishing inorganic salts, in amounts sufficient to supply all essential yeast foods for the yeast during the period of propagation, approximately half of the total amount of yeast nourishing salts being present as ammonium salts.

10. In a process of manufacturing yeast, the steps in the preparation of a yeast nutrient solution adapted for the propagation of yeast with aeration for the production of large commercial yields, which comprise, dissolving in water such amounts of sugar material and yeast nourishing inorganic salts as would be sufficient to supply all essential yeast foods during the period of propagation, and diluting the resultant solution to a degree corresponding to not more than 2° on the saccharometer whereby the said salts are rendered innocuous to the yeast.

11. In a process of manufacturing yeast, the steps in the preparation of a yeast nutrient solution adapted for the propagation of yeast with aeration for the production of large commercial fields, which comprise, dissolving in water such amounts of sugar material and yeast nourishing inorganic salts as would be sufficient to supply all essential yeast foods during the period of propagation and in such proportions that the amount of said salts is at least $\frac{15}{100}$ of the amount of sugar material, and diluting the resultant solution to such a degree as to render the salts innocuous to the yeast during the period of propagation.

12. In a process of manufacturing yeast, the steps in the preparation of a yeast nutrient solution adapted for the propagation of yeast with aeration, for the production of large commercial fields which comprise, dissolving in water such amounts of sugar material and yeast nourishing inorganic salts as would be sufficient to supply all essential yeast foods during the period of propagation and in such proportions that the amount of said salts is at least $\frac{15}{100}$ of the amount of sugar material, and diluting the resultant solution to a degree corresponding to not more than 2° on the saccharometer, whereby the said salts are rendered innocuous to the yeast.

13. As an article of manufacture, a compressed yeast product adapted for baking purposes, possessing normal quality and color, which has been obtained by propagation in a nutrient solution consisting of sugar material and yeast nourishing inorganic salts employed in quantities sufficient to furnish all essential yeast nutrients, said nutrient solution being of such initial dilution that the said salts are innocuous to the yeast.

In testimony whereof, I have affixed my signature.

FRIEDRICH HAYDUCK.

Certificate of Correction.

It is hereby certified that in Letters Patent No. 1,449,102, granted March 20, 1923, upon the application of Friedrich Hayduck, of Wilmersdorf, Germany, for an improvement in "Processes for the Manufacture of Compressed Yeast and the Product," an error appears in the printed specification requiring correction as follows: Page 1, line 63, for the word "organic" read *inorganic;* and that the said Letters Patent should be read with this correction therein that the same may conform to the record of the case in the Patent Office.

Signed and sealed this 29th day of May, A. D., 1923.

[SEAL.]

KARL FENNING,
*Acting Commissioner of Patents.*